(12) United States Patent
Inoue et al.

(10) Patent No.: US 7,494,108 B2
(45) Date of Patent: Feb. 24, 2009

(54) MOTOR-OPERATED VALVE

(75) Inventors: Yasushi Inoue, Tokyo (JP); Kouji Higuchi, Tokyo (JP); Hitoshi Umezawa, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 362 days.

(21) Appl. No.: 11/414,930

(22) Filed: May 1, 2006

(65) Prior Publication Data

US 2006/0261302 A1    Nov. 23, 2006

(30) Foreign Application Priority Data

May 19, 2005    (JP)    ............... 2005-146188

(51) Int. Cl.
*F16K 31/12* (2006.01)
(52) U.S. Cl. ................. 251/129.11; 251/265
(58) Field of Classification Search ............ 251/129.11, 251/264, 265
See application file for complete search history.

(56) References Cited

U.S. PATENT DOCUMENTS 2,388,989 A * 11/1945 Mueser ................. 251/265
3,409,271 A * 11/1968 Kallenbach ................. 251/265
5,318,064 A    6/1994 Reinicke
5,419,530 A * 5/1995 Kumar ................. 251/95
5,851,003 A    12/1998 Aoki et al.
7,165,755 B2 * 1/2007 Umezawa et al. ...... 251/129.11

FOREIGN PATENT DOCUMENTS

| EP | 0361539 | 11/1986 |
| EP | 0645569 | 8/1994 |
| EP | 1087158 | 3/2001 |
| JP | 2001-050415 | 2/2001 |
| JP | 2001-280535 | 10/2001 |
| WO | 02/23032 | 3/2002 |

* cited by examiner

*Primary Examiner*—John K Fristoe, Jr.
(74) *Attorney, Agent, or Firm*—Fildes & Outland, P.C.

(57) ABSTRACT

A motor-operated valve has a rotor unit in a can, and is rotationally driven by a stator unit. The rotation of the rotor unit is transmitted to a screw feed member. A stem member fixed to a valve body is engaged threadedly with the screw feed member by a first screw portion. At the same time, the screw feed member is engaged threadedly with an external thread portion fixed to a valve stem by the second screw portion. The first screw portion and the second screw portion constitute a differential screw mechanism, and feeds the valve stem according to a difference in pitch.

7 Claims, 8 Drawing Sheets

MOTOR-OPERATED VALVE

The present application is based on and claims priority of Japanese patent application No. 2005-146188 filed on May 19, 2005, the entire contents of which are hereby incorporated by reference.

BACKGROUND OF THE INVENTION

1. Field of the Invention

The present invention relates to a motor-operated valve used by being assembled into an air conditioner, a refrigerator, or the like and, more particularly, to a motor-operated valve capable of controlling the flow rate of a refrigerant accurately to a minute amount even in the case where a high-pressure refrigerant is used.

2. Description of the Related Art

For example, Patent Reference 1 describes a conventional general motor-operated valve. This motor-operated valve has a mechanism in which a rotor disposed on the inside of a can is rotationally driven by a stator provided on the outside of the can, and the rotational motion of rotor is converted into linear motion by a screw mechanism, by which the valve opening of a valve element with respect to a valve seat is controlled.

[Patent Reference 1] Japanese Patent Laid-Open No. 2001-50415

In the conventional motor-operated valve as described above, the flow rate of refrigerant is determined by the effective opening area of a valve port, namely, a lift amount of the valve element from the valve seat, and the lift amount of the valve element is determined by the pitch of the screw mechanism and the number of revolutions of the rotor (the number of steps of the stepping motor).

Generally, in the motor-operated valve of this type, in order to achieve a desired maximum flow rate, the maximum lift amount (fully opened state) of valve element, in other words, the maximum number of steps of the stepping motor is determined in advance. That is to say, stator energization control is carried out so that the rotor is rotated, for example, five turns at a maximum. In this case, in the case where the pitch of the screw mechanism is set, for example, at 0.6 [mm], if the rotor and a valve stem holder rotate one turn, two turns, three turns, four turns, or five turns, the lift amount of the valve element changes to 0.6, 1.2, 1.8, 2.4 or 3.0 [mm] at intervals of 0.6 [mm].

However, in particular, in a motor-operated valve (used as an expansion valve) used for a refrigerator or the like, the control in the prior art is rough although the controlled refrigerant flow rate is very low. Especially when carbon dioxide (gas) or the like are used, the pressure of refrigerant must be increased (about 10 times as compared with the conventional example). In the case where the high-pressure refrigerant is used, if the valve element is lifted at intervals of 0.6 [mm], there arises a problem in that a change in flow rate of the refrigerant becomes too great.

As one measure for solving this problem, it is conceivable, for example, that the diameter of the valve port or a valve angle (effective opening area) is decreased. However, the decrease in effective opening area has a limitation, and only such a measure cannot solve the above-described problem completely.

Also, as another measure, it is conceivable that the pitch of the screw mechanism is decreased (for example, from 0.6 [mm] to 0.2 [mm]). However, if the pitch of the screw mechanism is decreased, a highly accurate fabrication is required, and thus the fabrication cost increases. In addition, there arises a problem in that the lift amount per one rotor rotation is small, so that the contact and separation of a movable stopper with and from the fixed stopper, these stoppers being used to regulate rotation, are not accomplished properly.

SUMMARY OF THE INVENTION

The present invention has been made in view of the above circumstances, and accordingly an object thereof is to provide a motor-operated valve having a novel construction capable of properly controlling the flow rate of a refrigerant finely without causing hindrance to rotation regulation or the like even in the case where a high-pressure refrigerant is used, while using parts such as a stator that have been used in the existing motor-operated valve.

To achieve the above object, the present invention provides a motor-operated valve including a rotor of a motor accommodated on the inside of a can and a stator including an exciting coil disposed on the outside of the can, in which the rotational motion of the rotor is converted into linear motion by a screw mechanism, by which a valve opening with respect to a valve seat of a valve element is controlled, characterized in that the screw mechanism is formed by a differential screw having two screw portions having the same direction and a different pitch.

The motor-operated valve further includes a screw feed member rotating integrally with the rotor; a stem member fixed to a valve body that accommodates the valve seat; a valve stem which is inserted slidably in the stem member to support the valve element; and an external thread member fixed to the valve stem. The screw feed member engages threadedly with a first screw portion provided between the screw feed member and the stem member and a second screw portion provided between the screw feed member and the external thread member, and the first screw portion has a larger pitch than the second screw portion.

In the motor-operated valve in accordance with the present invention, since a differential screw mechanism is provided, the resolution of valve opening with respect to the rotation angle of rotor is improved, and more accurate control can be carried out.

DETAILED DESCRIPTION OF THE PREFERRED EMBODIMENTS

Figure 1:
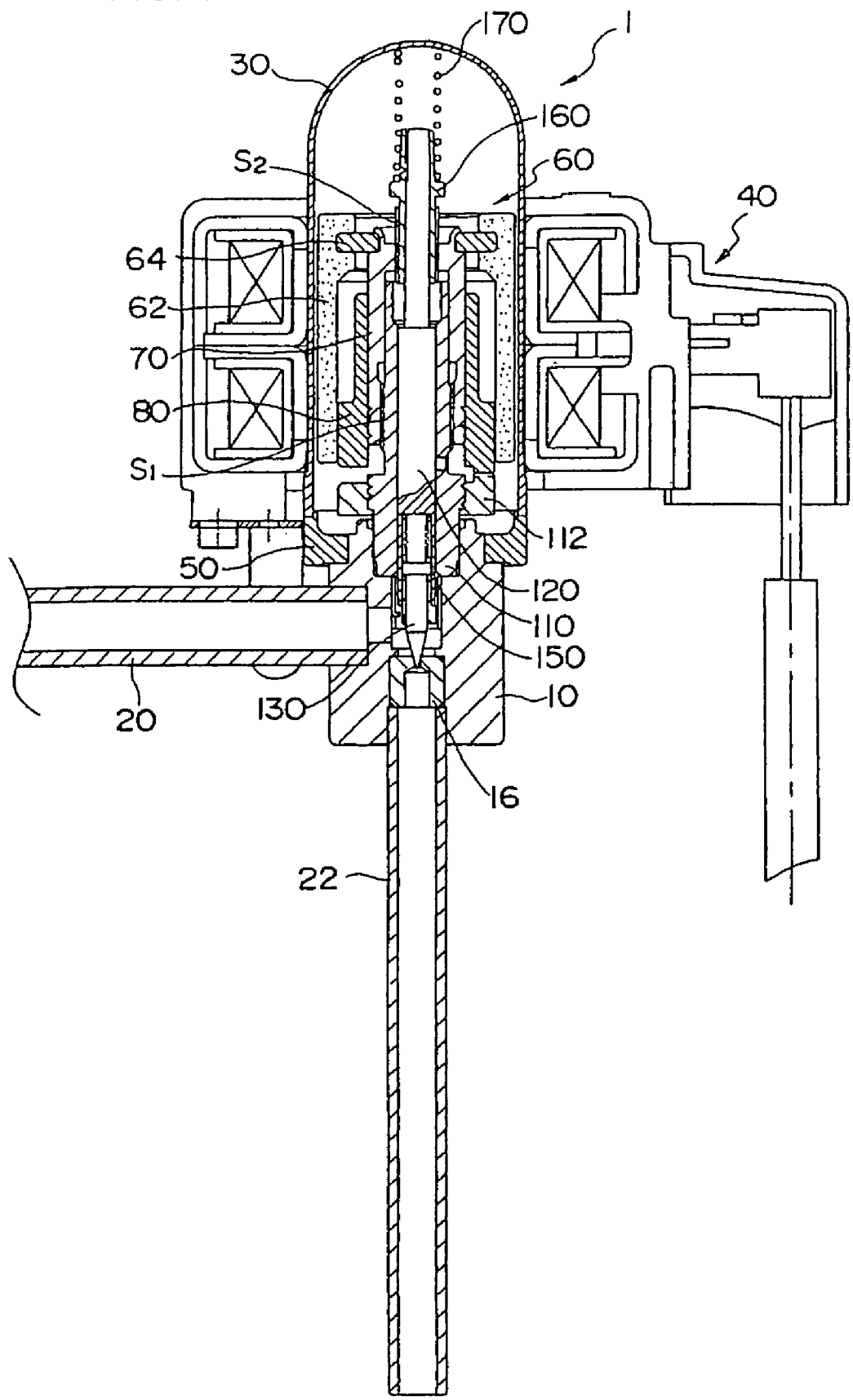
FIG. 1 is an explanatory view showing the entire construction of a motor-operated valve in accordance with the present invention.

FIG. 1 shows the entire construction of a motor-operated valve in accordance with the present invention.

A motor-operated valve the whole of which is denoted by reference numeral 1 has a valve body 10, and a valve seat member 16 is inserted in the valve body 10. The valve body 10 is connected with pipes 20 and 22.

In the upper part of the valve body 10, a can 30, which is a cylindrical pressure vessel, is fixed via a supporting member 50. On the outside of the can 30, a stator unit 40 of a stepping motor, which is used as one example of drive motor, is mounted.

In the can 30, a rotor unit 60 is rotatably disposed. The rotor unit 60 includes a rotor 62 consisting of a plastic magnet formed by mixing a magnetic material in a resin, and a screw feed member 70 connected to the rotor 62 via a ring member 64.

The screw feed member 70 has a first screw portion $S_1$ and a second screw portion $S_2$, which are formed in the same turning direction, and the pitch of the first screw portion $S_1$ is set so as to be larger than the pitch of the second screw portion $S_2$.

A stem member 110 fixed to the valve body 10 has an external thread portion engaging threadedly with the first screw portion $S_1$. On the outside of the screw feed member 70, a rotation stopper member 80 is fixed. When the rotor unit 60 lowers to the lowermost end, the protruding portion of the rotation stopper member 80 abuts on the protruding portion of a stopper member 112 on the fixed side, by which the lower end position of the rotor unit 60 is regulated.

In the stem member 110, a valve stem 120 is slidably inserted. At the tip end of the valve stem 120, a valve element 130 is installed, and a pressure is given to the valve element 130 by a coil spring 150. The valve element 130 controls the flow path opening area with respect to the valve seat member 16.

An external thread member 160 attached to the upper part of the valve stem 120 has an external thread portion engaging threadedly with the second screw portion $S_2$ of the screw feed member 70. Above the external thread member 160, an urging spring 170 is installed to remove backlash of screw portion.

When the rotor unit 60 is rotated by receiving a pulse signal from the stator unit 40, the rotor unit 60 moves up and down corresponding to the screw pitch of the first screw portion $S_1$ engaging threadedly with the stem member 110.

When the rotor unit 60 is rotated, the internal thread side of the second screw portion $S_2$ of the screw feed member 70 is also rotated, and the valve stem 120 is fed by the screwing action of the external thread member 160 attached to the valve stem 120.

The feed amount (pitch) of the valve stem 120 is an amount obtained by subtracting the pitch of the second screw portion $S_2$ from the pitch of the first screw portion $S_1$. That is to say, the first screw portion $S_1$ and the second screw portion $S_2$ constitute what is called a differential screw mechanism. By using this differential screw mechanism, the motor-operated valve in accordance with the present invention can increase the resolution of valve opening while the resolution of stepping motor is kept the same.

Figure 2:
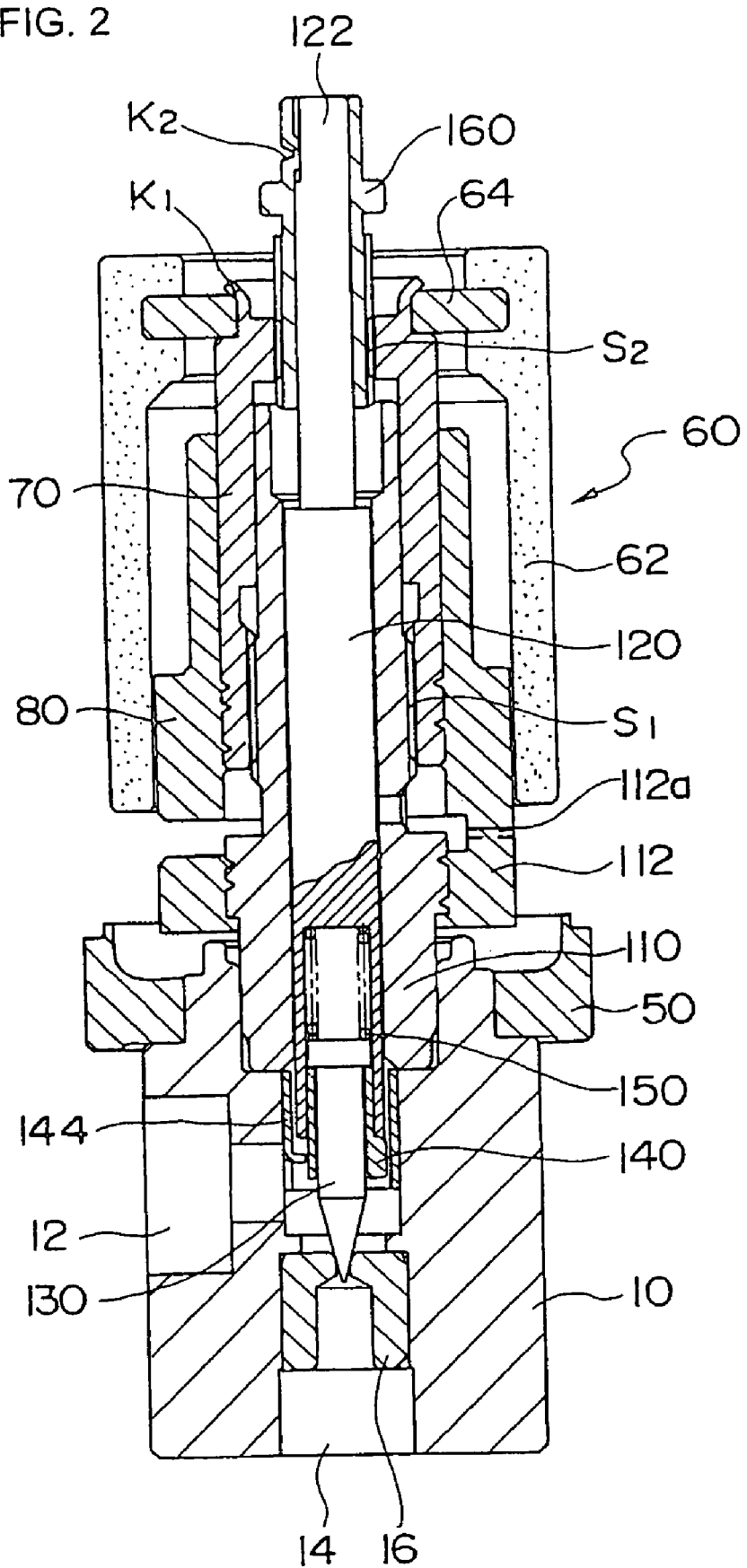
FIG. 2 is an explanatory view showing a configuration of a motor-operated valve in a state in which a stator unit, a can, pipes, and the like are removed.

FIG. 2 is an explanatory view showing a configuration of the motor-operated valve in a state in which the stator unit 40, the can 30, the pipes 20 and 22, and the like are removed.

The rotor 62 constituting the rotor unit 60 is fixed to the screw feed member 70 via the ring member 64. Staking means $K_1$ is used as a fixing means, the upper end portion of the valve stem 120 has a small-diameter portion 122, and the small-diameter portion 122 has a flat face in cross section, namely, is fabricated into a D cut face.

The external thread member 160 is fitted on the valve stem 120 by utilizing the D cut face, and is fixed by staking means $K_2$. By this configuration, the external thread member 160 is fixed to the valve stem 120 so as to provide a locking function to prevent the rotation of the valve stem. The screw feed member 70 and the external thread member 160 are engaged threadedly with each other via the second screw portion $S_2$. When the screw feed member 70 is rotated together with the rotor 62, the valve stem 120 is moved up and down by the operation of the second screw portion $S_2$.

On the other hand, the screw feed member 70 has an internal thread portion, and is engaged threadedly with the external thread portion of the stem member 110 by the first screw portion $S_1$.

In the first screw portion $S_1$ and the second screw portion $S_2$, screw portions having the same direction are fabricated. For example, the first screw portion $S_1$ is fabricated into a screw having a nominal diameter of 6 mm and a pitch of 0.6 mm. The second screw portion $S_2$ is fabricated into a screw having a nominal diameter of 3.5 mm and a pitch of 0.5 mm.

By this configuration, when the rotor 62 is rotated one turn, the screw feed member 70 is moved up and down by a distance of 0.6 mm. At the same time, the valve stem 120 engaging threadedly with the screw feed member 70 is moved up and down by a distance of 0.5 mm with respect to the screw feed member 70. Since the screw portions $S_1$ and $S_2$ are screw portions having the same direction, the valve stem 120 is moved through a distance of 0.1 mm with respect to one turn of the rotor 62.

Therefore, for example, a motor-operated valve having only the first screw portion $S_1$ has a feed amount of 0.6 mm per one turn of rotor as a feed screw portion, so that the motor-operated valve can provide six times of control accuracy (resolution).

Also, this motor-operated valve requires a mechanism for sliding the valve stem 120 in the axial direction without rotating the valve stem 120 around the axis line.

In the motor-operated valve in accordance with the present invention, a locking member 140 is pressed into the tip end portion of the valve stem 120 under pressure, and is caused to abut on a guide member 144 pressed into the valve body 10 under pressure, by which a mechanism that stops the rotation and slides the valve stem 120 in the axial direction is formed.

Figure 3:
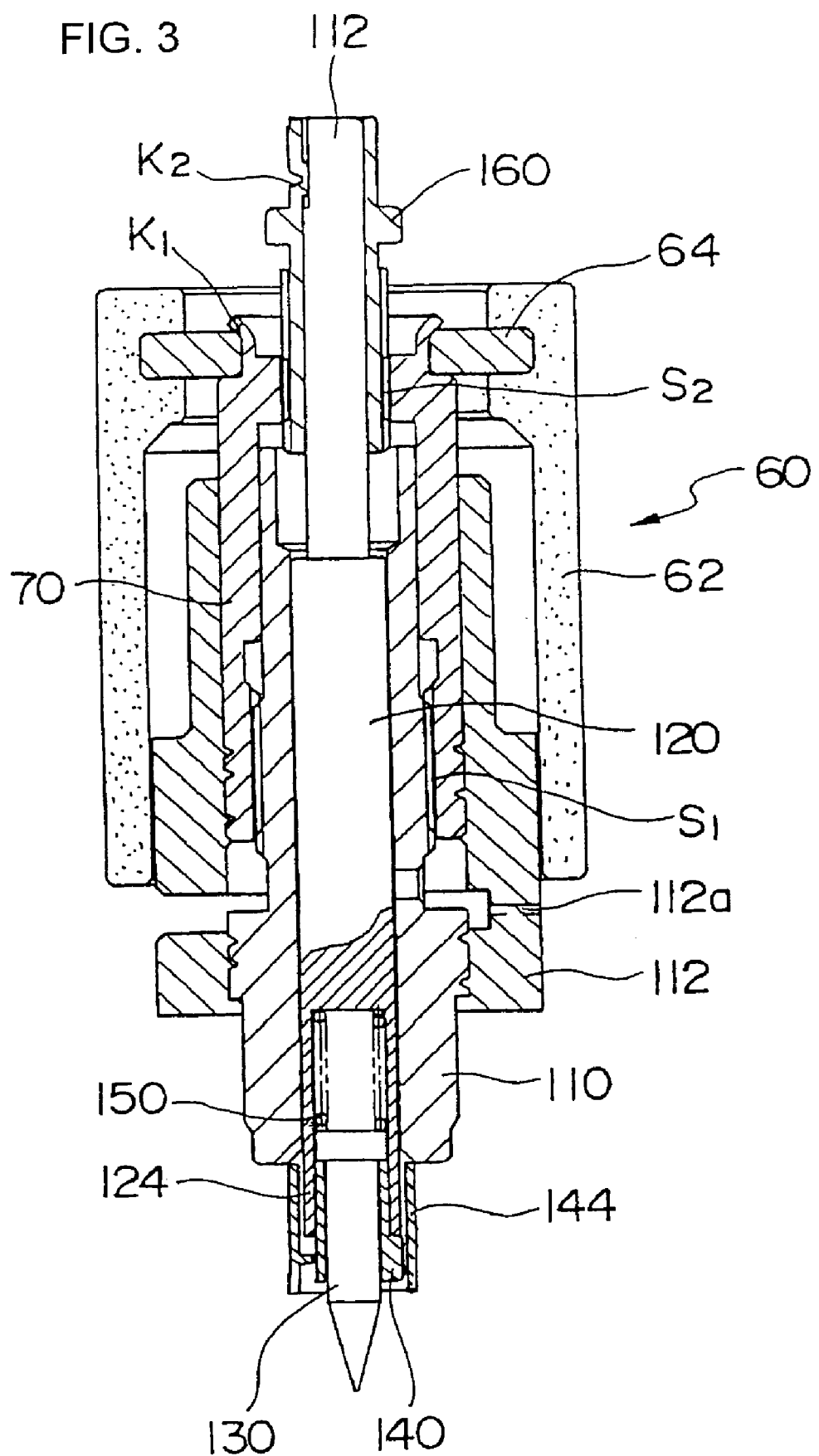
FIG. 3 is an explanatory view of principal elements.

FIG. 3 shows principal elements before being assembled to the valve body 10.

This figure shows a state in which the protruding portion in the lower end portion of the rotation stopper member 80 abuts on a protruding portion 112a of the stopper member 112 fixed to the stem member 110, by which the lower end position of the rotor unit is regulated.

Figure 4:
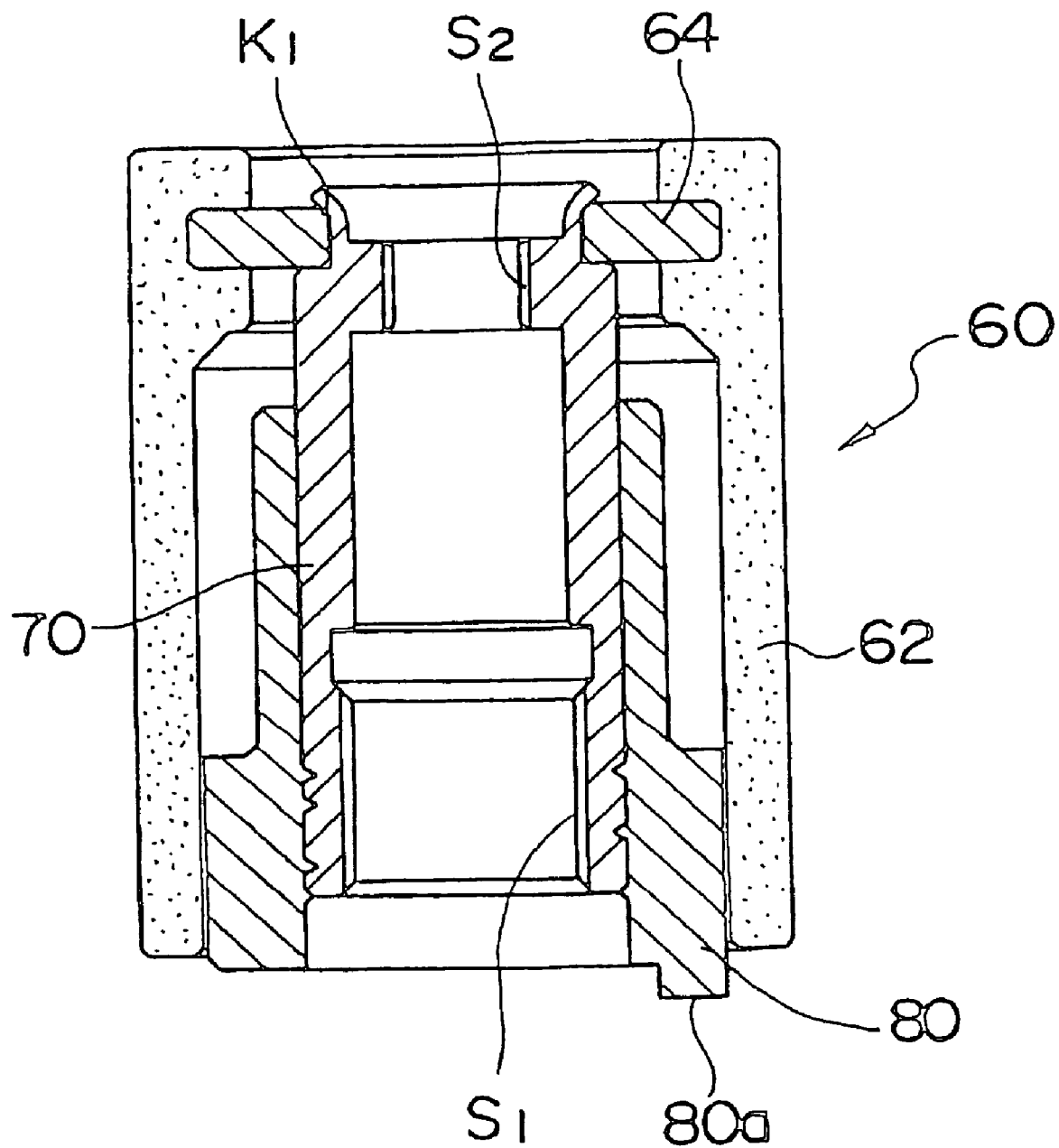
FIG. 4 is an explanatory view showing a general configuration of a rotor unit.

FIG. 4 shows a general configuration of the rotor unit 60. This figure shows the internal thread portion of the first screw portion $S_1$, the internal thread portion of the second screw portion $S_2$, and a protrusion 80a formed in the lower end portion of the rotation stopper member 80.

Figure 5:
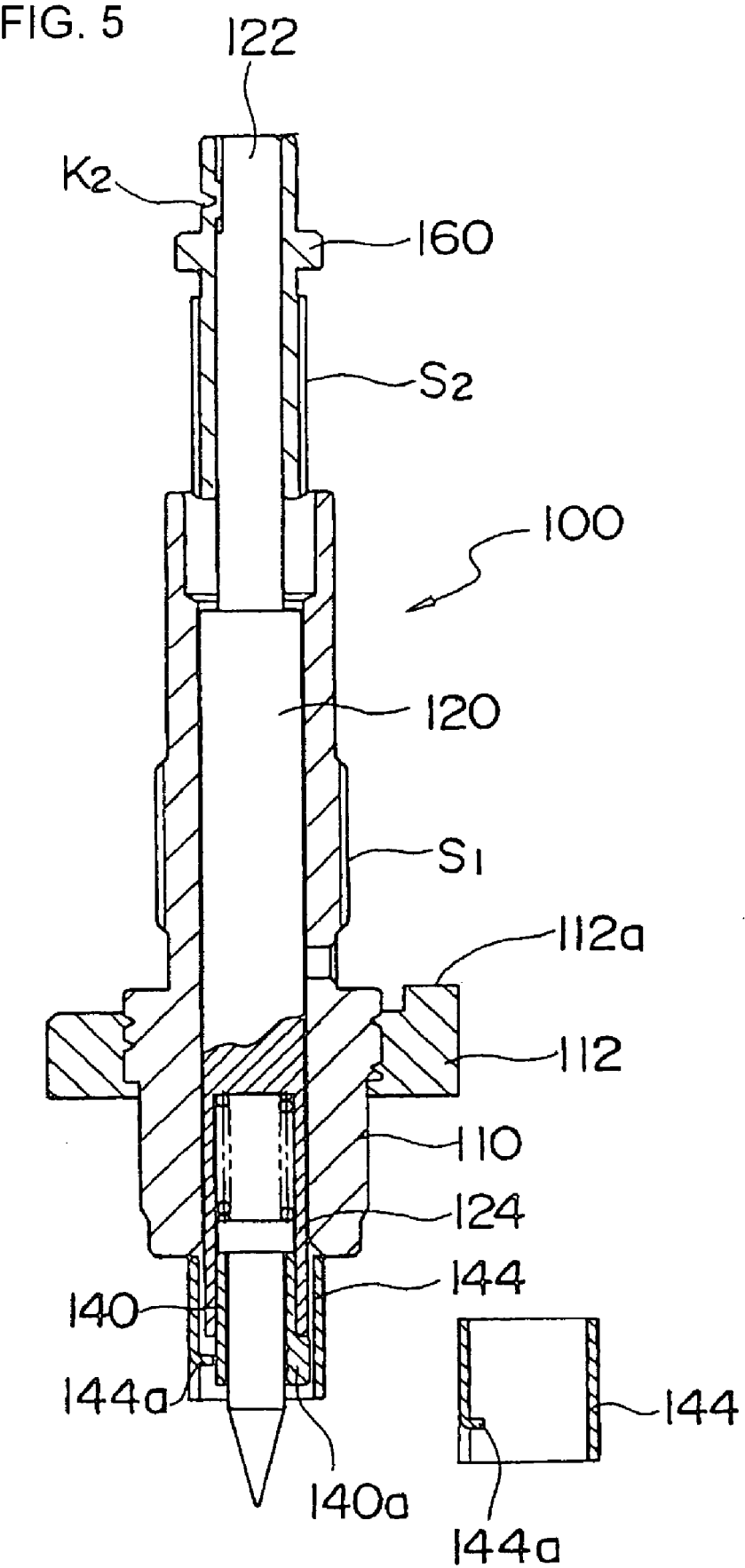
FIG. 5 is an explanatory view showing a general configuration of a valve stem unit.

FIG. 5 shows a general configuration of a valve stem unit 100.

The valve stem 120 is inserted slidably in the stem member 110, and the locking member 140 is pressed into the valve stem 120 under pressure. The locking member 140 has a flat face or a groove portion provided partially in a large-diameter portion 140a.

The stopper member 144 fixed to the valve body 10 has a protruding portion 144a projecting to the inside, and the protruding portion 144a abuts on the flat face or the groove portion of the locking member 140, by which the turning of the valve stem 120 is restrained.

Figure 6:
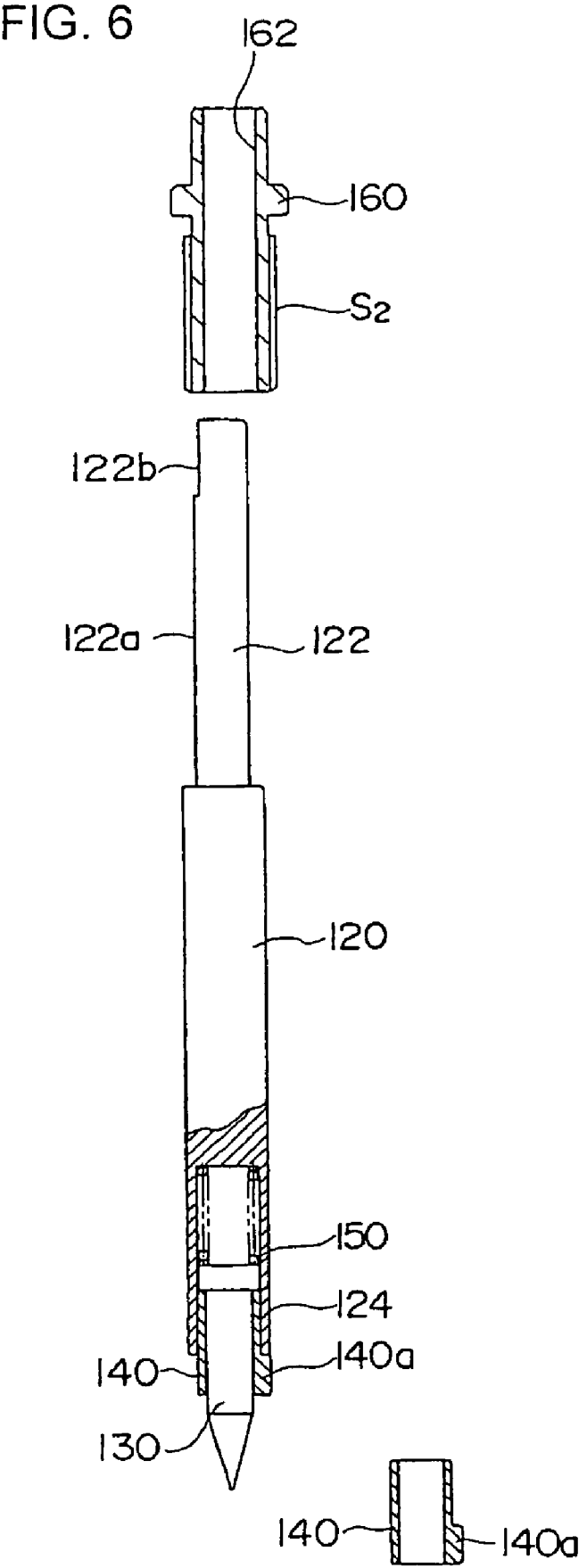
FIG. 6 is an explanatory view showing the assembly of a valve stem.

FIG. 6 shows the assembly of valve stem and the details of the external thread member 160 attached to the small-diameter portion 122. The upper end portion of the small-diameter portion 122 of the valve stem 120 has a flat face 122*b* fabricated in a cylindrical face 122*a*. The external thread member 160 is fitted on the small-diameter portion of the valve stem 120, and staking is performed ($K_2$ portion shown in FIGS. 2 and 3), by which the external thread member 160 is fixed to the valve stem 120. The inside of the staking portion is pressed on the flat face 122*b*, which also restrains the turning of the valve stem 120.

Figure 7:
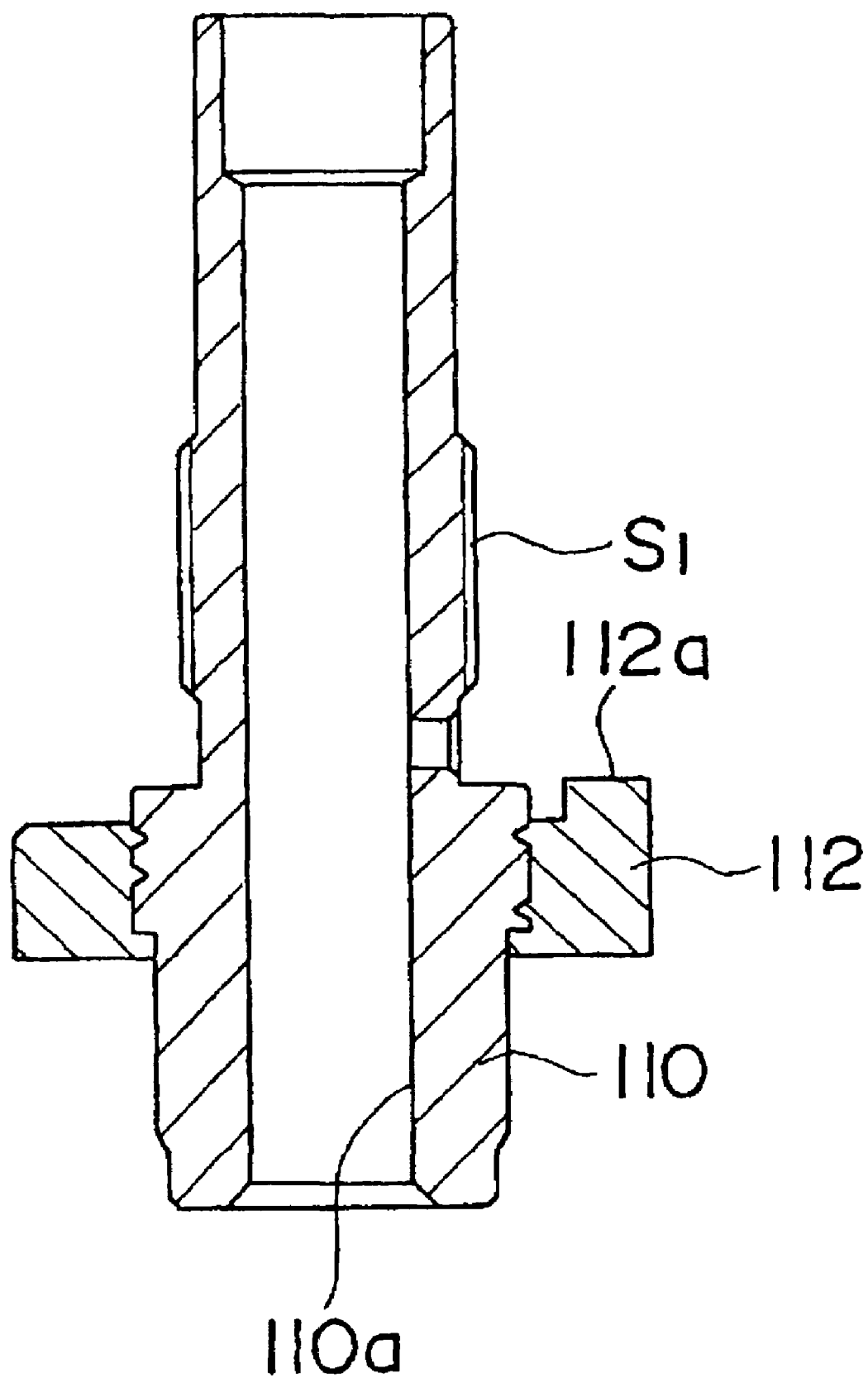
FIG. 7 is an explanatory view showing a general configuration of a stem member.

FIG. 7 shows a general configuration of the stem member. An inside-diameter portion 110*a* of the stem member 110 slidably receives the valve stem 120. To the outer peripheral portion of the stem member 110, the stopper member 112 is fixed. The stopper member 112 has the protruding portion 112*a* for stopper.

Figure 8:
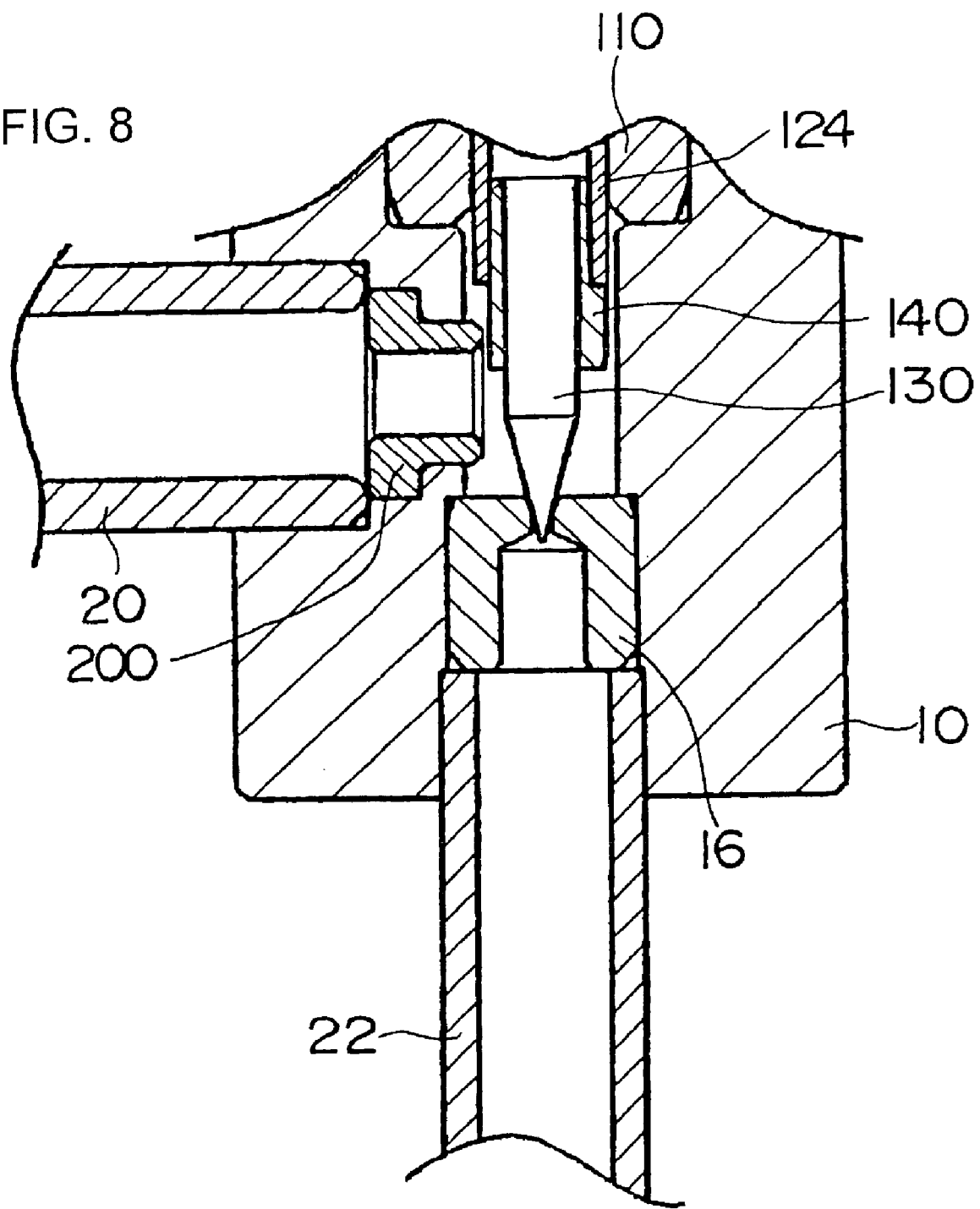
FIG. 8 is an explanatory view showing another example of a motor-operated valve in accordance with the present invention.

FIG. 8 shows another example of the motor-operated valve in accordance with the present invention.

The configuration in which the locking member 140 is inserted in a tip end portion 124 of the valve stem is the same as that of the above-described example.

Instead of the guide member fixed to the valve body 10, an orifice 200 is fixed to the valve body 10. The orifice 200 has a function of inhibiting air bubbles in the passing refrigerant from passing therethrough, and also the tip end portion thereof abuts on the locking member 140 so that the orifice 200 functions as a member for restraining the turning of the valve stem.

What is claimed is:

1. A motor-operated valve comprising a rotor of a motor accommodated on the inside of a can and a stator including an exciting coil disposed on the outside of the can, in which rotational motion of the rotor is converted into advance and retreat motion by a screw mechanism, by which a valve opening with respect to a valve seat of a valve element is controlled, wherein the motor-operated valve further comprises a screw feed member rotating integrally with the rotor; a stem member fixed to a valve body that accommodates the valve seat; a valve stem which is inserted slidably in the stem member to support the valve element; and an external thread member fixed to the valve stem, and the screw feed member engages threadedly with a first screw portion provided between the screw feed member and the stem member and a second screw portion provided between the screw feed member and the external thread member, and the first screw portion has a larger pitch than the second screw portion.

2. The motor-operated valve according to claim 1, comprising an urging spring for removing backlash in the screw portion.

3. The motor-operated valve according to claim 1, comprising
an urging spring for removing backlash in the screw portion, wherein
the urging spring is a coil spring interposed between the external thread member and an inner surface of the can.

4. The motor-operated valve according to claim 1, comprising a locking means to prevent the rotation of the valve stem.

5. The motor-operated valve according to claim 4, wherein, the locking means further comprises a stopper member fixed to the valve body.

6. The motor-operated valve according to claim 4, wherein the locking means further comprises an orifice to prevent the flow of the bubble in the coolant fixed to the valve body.

7. The motor-operated valve according to claim 1, comprising an urging spring for removing backlash in the screw portion.

* * * * *